United States Patent Office.

REUBEN JOHNSON, OF DANBURY, CONNECTICUT.

Letters Patent No. 73,812, dated January 28, 1868.

IMPROVEMENT IN FELTED HAT-BODIES.

*The Schedule referred to in these Letters Patent and making part of the same.*

TO ALL WHOM IT MAY CONCERN:

Be it known that I, REUBEN JOHNSON, of Danbury, in the county of Fairfield, and State of Connecticut, have invented a certain new and useful Improvement in the Manufacture of Hat-Bodies; and I do hereby declare that the following is a full and correct description thereof.

My said invention relates to hat-bodies or similar fabric, formed by blowing fur into the air by a picker or brush, and collecting the fibres upon an exhausted pervious former of the desired shape for the bat; and it consists in mixing with the fur-fibres wool-fibres, prepared as follows:

I take the wool, and wash it and card it as well as if it were to be used for winding wool-bats on a solid cone, as practised in the manufacture of wool-hat bodies, and then cut the fibres in the sliver delivered from the carding-engine, very short, say about an eighth of an inch, more or less. This may be done by a shears, by hand, cutting across the sliver at a distance of an eighth of an inch from cut to cut, or it may be done by a shears automatically operated by the carding-engine, so as to cut across the sliver as delivered from the carding-engine, but I make no claim here to the means of cutting the fibres. The object of cutting them short is to have the fibre of wool about the weight of the fibre of fur it is to be mixed with, so that, when the mixed fur and wool is thrown into the air by the picker or brush, it will travel with the fur equally, and be deposited on the pervious forming-cone intermixed with the fur as intimately as when the mixture of wool and fur is made.

Wool properly washed, carded, and cut short, as above described, may be mixed with fur suitable for hat-bodies in equal proportions, and in proportions of less than half of the whole stock of wool, and perhaps more than half wool, but I do not recommend giving beyond half, because the resulting hat-body will have too much the appearance of a wool-hat body.

My object is to cheapen the manufacture of fur hat-bodies and strengthen them, by introducing wool, which is a good felting-material, in such proportions as to produce a bat, which, when felted, has the characteristics of a fur-hat body, and will be better than some hat-bodies made entirely of fur. One-third wool will make a good hat-body with fur, the quality depending upon the quality of both wool and fur. The mixture of the wool strengthens the body, and yet does not detract from its appearance, because, in the process of sizing in or felting the bat, the fur works to the outside surface.

I mix the finely-cut wool with the fur by a bowstring, as hatters mix fur by hand, or it may be fed into a fur-blowing or mixing-machine, in the same way as fur of different kinds is ordinarily mixed for hatter's use.

When the mixture is made it can be formed into bats by the hand-bowing process, or by any of the forming-machines in use.

I claim as my invention and improvement in the manufacture of hat-bodies, and similar felted articles of felted fur—

The admixture of wool and fur-fibres, the former being cut into short lengths to equalize the relative weight of fibres, substantially as and for the purpose described.

REUBEN JOHNSON.

Witnesses:
   A. P. ROCKWELL,
   HENRY TREADWELL.